April 30, 1963 D. D'EUSTACHIO 3,087,576
SOUND ABSORBERS
Filed June 20, 1958 6 Sheets-Sheet 1
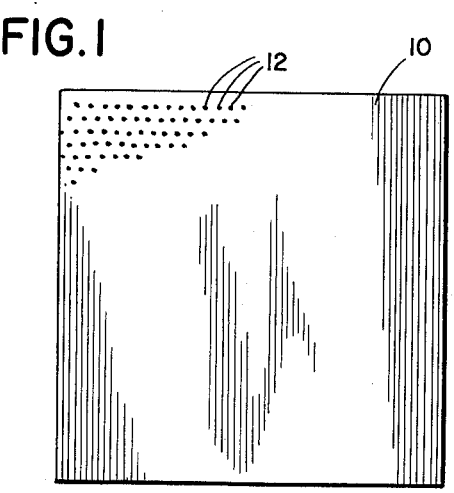
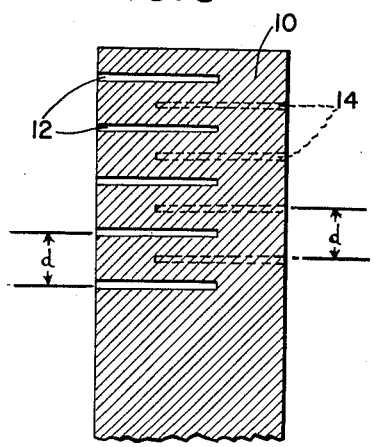
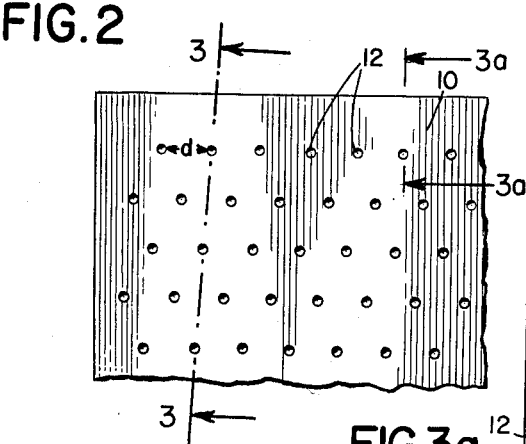
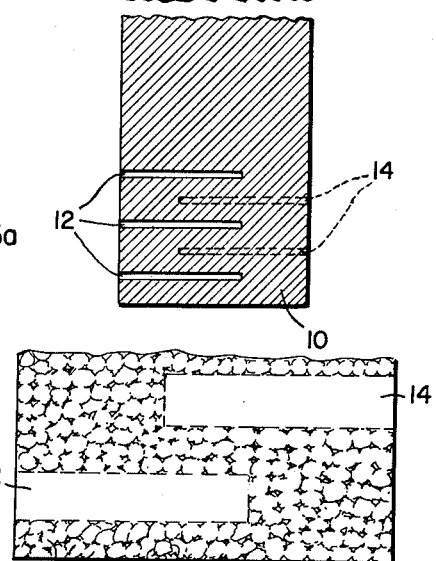
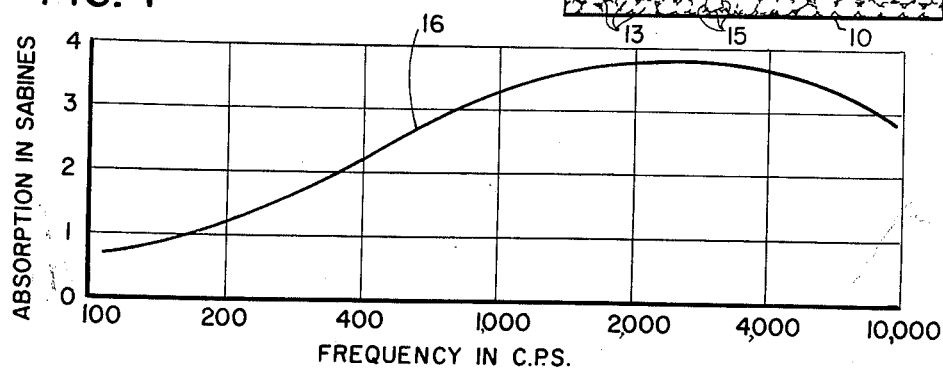

April 30, 1963  D. D'EUSTACHIO  3,087,576
SOUND ABSORBERS
Filed June 20, 1958  6 Sheets-Sheet 2

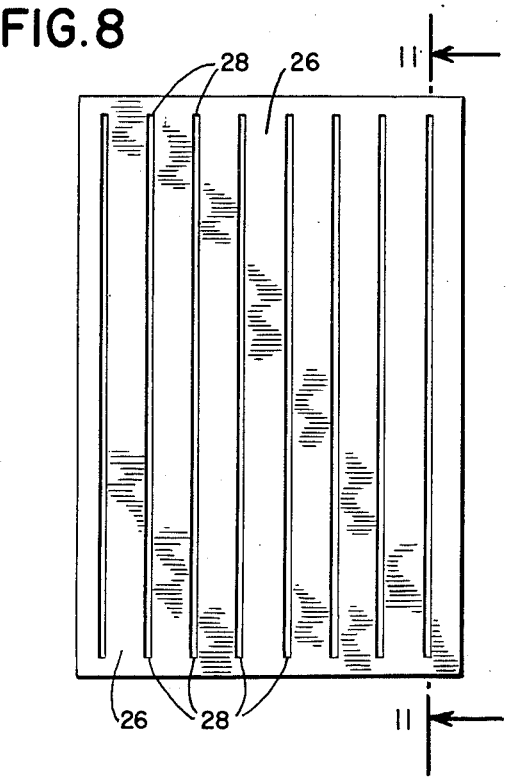
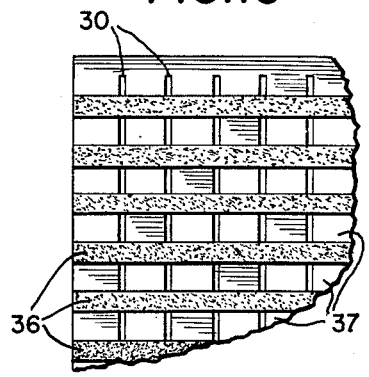
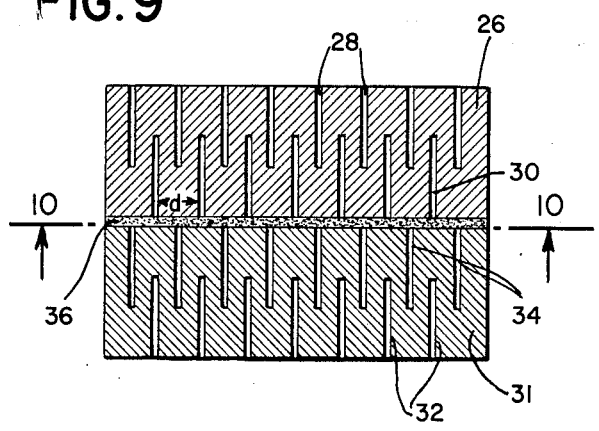
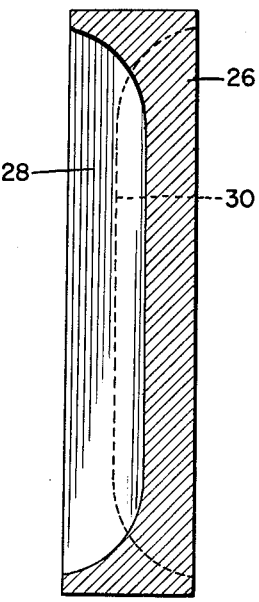

April 30, 1963 D. D'EUSTACHIO 3,087,576
SOUND ABSORBERS
Filed June 20, 1958 6 Sheets-Sheet 4
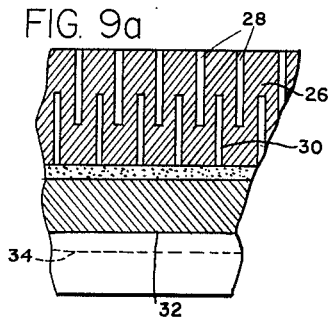
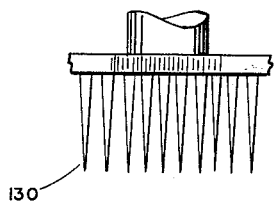
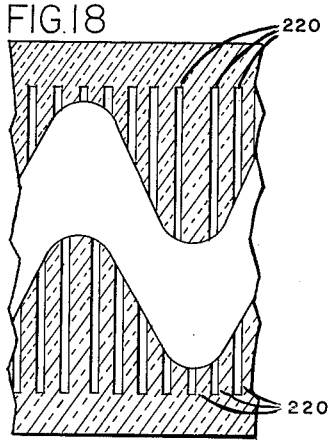
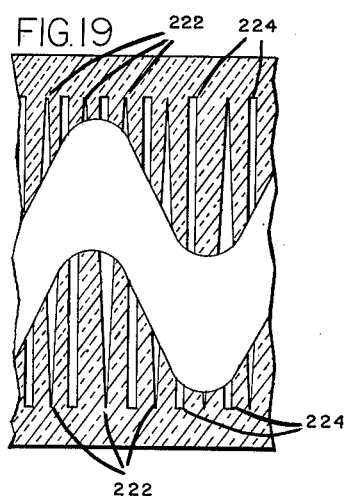
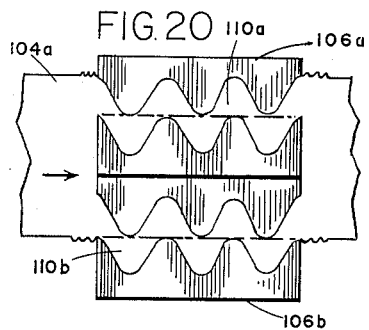
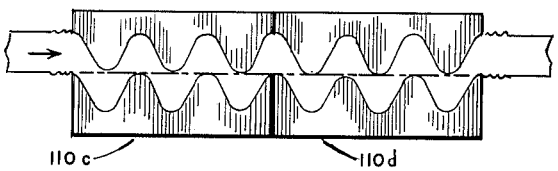

April 30, 1963  D. D'EUSTACHIO  3,087,576
SOUND ABSORBERS

Filed June 20, 1958  6 Sheets-Sheet 5

April 30, 1963 D. D'EUSTACHIO 3,087,576
SOUND ABSORBERS
Filed June 20, 1958 6 Sheets-Sheet 6

United States Patent Office 3,087,576
Patented Apr. 30, 1963

3,087,576
SOUND ABSORBERS
Dominic D'Eustachio, Port Allegany, Pa., assignor to Pittsburgh Corning Corporation, Allegheny County, Pa., a corporation of Pennsylvania
Filed June 20, 1958, Ser. No. 743,425
6 Claims. (Cl. 181—33)

This invention relates to sound absorbers and to methods and apparatus for making them and for adjusting their acoustic impedance.

This application is a continuation-in-part of my applications Serial No. 566,159 filed February 17, 1956, now Patent No. 2,853,147, and Serial No. 559,191 filed January 16, 1956, now abandoned.

One object of the invention is to provide an efficient and economical method and apparatus for making highly effective sound absorbers.

Another object of the invention is to provide a method for adjusting, in a continuously variable and easy-to-control manner, the acoustic impedance of a sound absorbing device, particularly one comprising open-celled frangible cellular material.

Another object is to provide an improved sound absorber, particularly one having unusually high absorption of acoustic energy at low frequencies.

Still another object is to provide a convenient and economical method and means for attaining a high distributed absorption over a large wall area.

In one of the embodiments of the invention, there is provided a sound absorber comprising a body of locally-brittle porous material, for example, open-celled frangible cellular glass, the said body being modified to improve its sound-absorbing properties by adjustment of its acoustic impedance, as described herein.

Sound absorbers which may be made as described herein may, for example, be of the various types often called space absorbers, or wall absorbers, or duct-type absorbers.

A "space absorber" is typically a body of sound absorbing material suspended in a space in which the energy of sound waves is to be absorbed, usually so that at least its principal faces are exposed.

A "wall absorber," on the other hand, is one having one of its faces, usually a principal face, against a wall or ceiling.

A "duct-type absorber" is one designed to be used in, or as a portion of, a duct, for example, one on the outlet side of an exhaust fan, wind tunnel, etc.

In some cases space absorbers are suspended in ducts to act as duct absorbers.

In various embodiments of the invention, the acoustic impedance of a body of open-celled frangible cellular material is modified by the formation therein of a plurality of recesses or cavities extending part way into it. These recesses may, for example, take the form of relatively deep but narrow holes or slots. A feature is not only that the holes or slots modify the acoustic properties (impedance) of the material of which the absorber is made, but that this material is selected to have characteristics such that the modifications of it are economically practical to make and can be controlled with the needed precision.

Although highly useful results may be obtained when the recesses extend into the material from only one surface, even better effects may be obtained when, as in certain embodiments of the invention, they extend in from the opposite principal surfaces.

A characteristic of the sound absorbers described herein is that they provide high damping of the motion of the air in and out of these recesses in response to the pressure fluctuations caused by sound waves. In addition to the friction effects provided by the walls of the recesses themselves, an important factor is that, because of the open-celled nature of the material, there is communication between the air within a given recess and regions surrounding the recess. Thus, the air in regions surrounding the recess is subjected to considerable friction itself, and it in turn tends to damp the motion of the air within the recess.

In accordance with certain important embodiments of the present invention, the construction is such that still another action is produced. Each recess is sufficiently close to its neighboring ones that the pressure fluctuations or air motion within one recess affects the air in a zone surrounding it, and this zone overlaps with the zone of influence of neighboring recesses. Thus pressure fluctuations in one recess cause pressure fluctuations in a surrounding zone of the open-celled cellular material, and these fluctuations in turn interact with those produced by the action of the air in the neighboring recesses.

In embodiments in which recesses extend into the absorber from opposite surfaces, not only does the action in each recess affect the action in its neighboring recesses extending into the material from the same side, but it affects the action in other recesses extending in from the opposite side. In certain important embodiments, the recesses from opposite sides extend in far enough, and are so spaced, that in the region of their inner ends they overlap but do not intersect. In addition to the fact that this overlapping increases the action which has just been described, it broadens the band of frequencies for which the absorber is particularly effective.

The spacing between an individual recess and its neighboring recesses, and the nature of the intervening open-celled cellular material, cause certain important phase-shift effects. There is little or no phase shift between the pressure fluctuations of the air outside the absorber and those of the air in an exposed recess; however, as the pressure fluctuations within two recesses (for example, one entering from one side of the absorber and one entering from the other) are communicated through the intervening open-celled cellular material toward one another, there is a phase shift effect, and this increases the absorption.

Heretofore, sound absorbers applied to a wall have typically had the difficulty that the wall itself presented a rigid termination. To overcome this difficulty, in some cases, the absorbers were suspended some distance away from the wall (for example a distance from a few inches to a few feet). This arrangement was not a very satisfactory solution, because this space between the absorber and the wall, of itself, had no absorption properties; furthermore the arrangement was mechanically awkward. Furthermore, when ceilings were constructed in that manner, the space above between the absorber and the ceiling often permitted the sound to travel readily horizontally, often great distances.

Certain important embodiments of wall absorbers in accordance with the present invention overcome these difficulties. Excellent results may be obtained by applying directly to the wall, without the necessity of intervening space, an absorber of open-celled frangible cellular material, having a plurality of narrow but deep recesses extending into it from each of its opposite principal faces, one of these faces being exposed to the room and the other being against the wall. The recesses which extend into it from the side next to the wall serve, at least in part, as a phase shifting termination.

In certain embodiments of the method for forming sound absorbers in accordance with the present invention, there are performed the steps of applying gaseous pressure to a block of frangible cellular material to obtain intercommunicating cells, cutting the block to the general shape needed for the absorber, and then forming in it a plurality of recesses extending from the surface into same. To form these recesses, the body of open-celled frangible cellular material is subjected to mechanical point loading. For example, a plurality of rods, or other thin, relatively rigid members, may be forced into it so as to form channels by progressively breaking through the cells of the material as these members are forced inwardly, and are then withdrawn, leaving the desired recesses or cavities. In another example, localized loading may be applied with a saw, to form slots.

If recesses are to be formed in both principal faces of the absorber, there are important advantages in applying point loading to its opposite surfaces simultaneously. Sound absorbers of high quality can, by the method described herein, be made from open-celled cellular glass, which is characterized by rigidity, high compressive strength, and the ability to break locally and cleanly when point loaded. It is therefore possible to form in it, by point loading, very acurately shaped recesses, which have initially, and permanently retain, exactly the dimensions required to produce the sound absorption desired.

Modifying the material by the proposed method so as to form these recesses changes the acoustic impedance of the absorber by adding reactive elements to it and serves to adjust the acoustic impedance of the absorber to an optimum value for sound absorption.

Other features, objects and advantages will appear from the following more detailed description of illustrative embodiments of the invention, which will now be given in conjunction with the accompanying drawings.

In the drawings,

FIG. 1 is a front elevational view of a space absorber, as seen from one of its principal faces;

FIG. 2 is an enlarged view of a portion of the absorber shown in FIG. 1, from the same viewpoint;

FIG. 3 is an enlarged cross-sectional view of the absorber of FIGS. 1 and 2, as seen in a sectional plane indicated at 3—3 in FIG. 2. This view is drawn to a scale larger than that of FIG. 1 but smaller than that of FIG. 2;

FIG. 3a is an enlarged fragmentary cross-sectional view of the absorber of FIGS. 1–3, taken along the line 3a—3a in FIG. 2, and is illustrative of the open-celled, cellular structure of absorbers constructed in accordance with the various illustrated embodiments of the invention;

FIG. 4 is a graph of absorption versus frequency representing the performance of the type absorber illustrated in FIGS. 1–3;

FIG. 8 is an elevational view of one layer of another embodiment of a wall absorber;

FIG. 9 is a cross-sectional view of an absorber comprising two of the layers of the type shown in FIG. 8 bonded together with adhesive;

FIG. 9A is a fragmentary cross-sectional view of a portion of a two-slab absorber which is generally of the type shown in FIG. 9, except that in FIG. 9a the slabs are so oriented that slots in one of the slabs run at right angles to those in the other slab;

Figures 12, 12A:
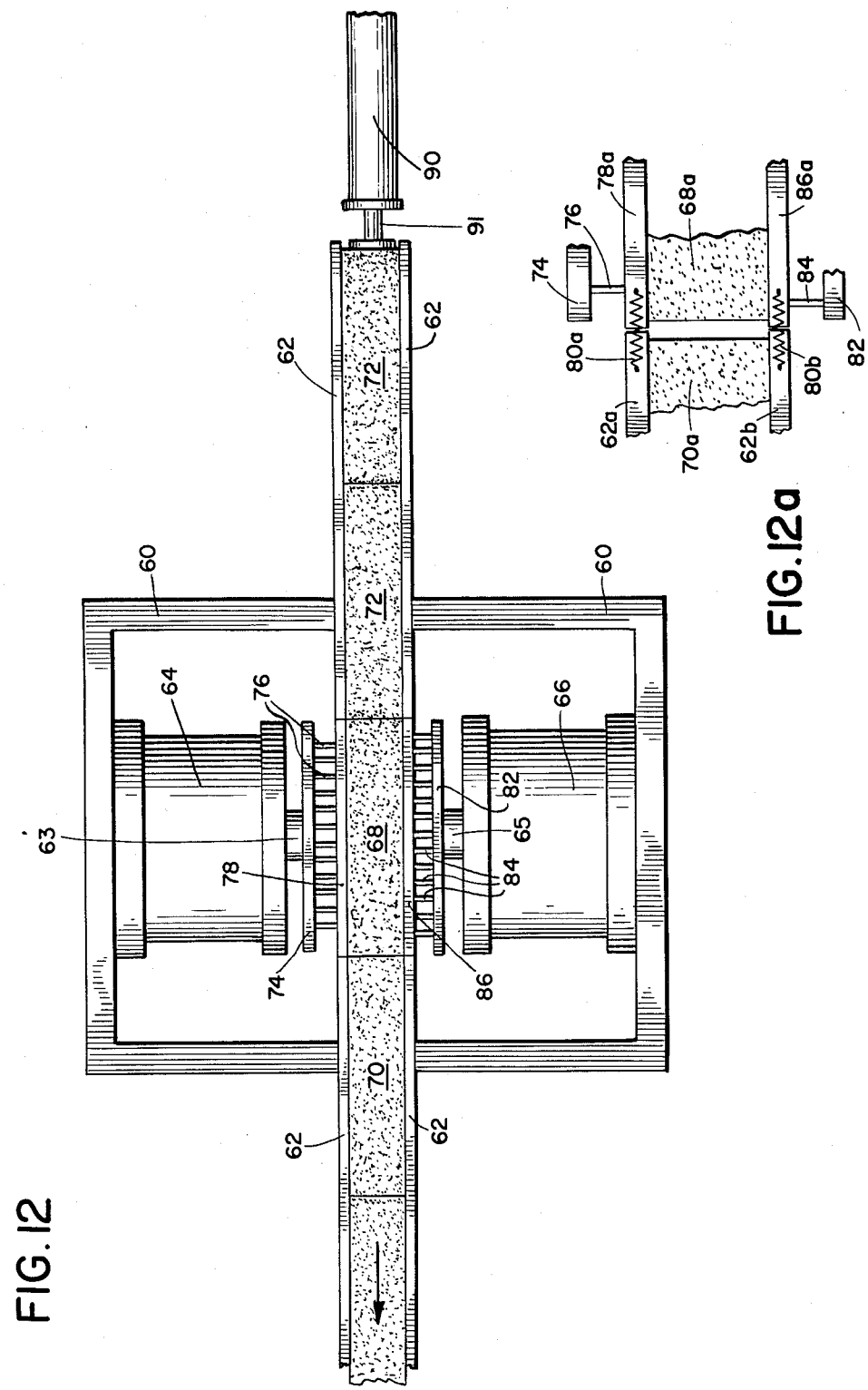
Figure 13:
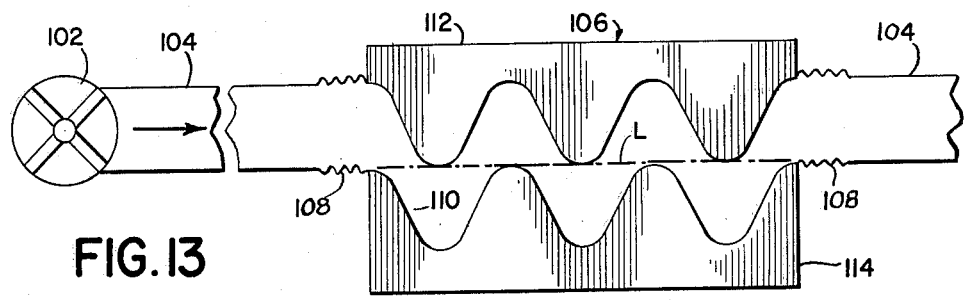
Figure 14:
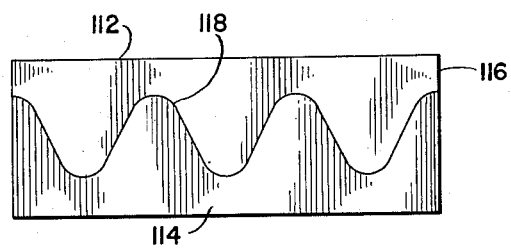
Figure 15:
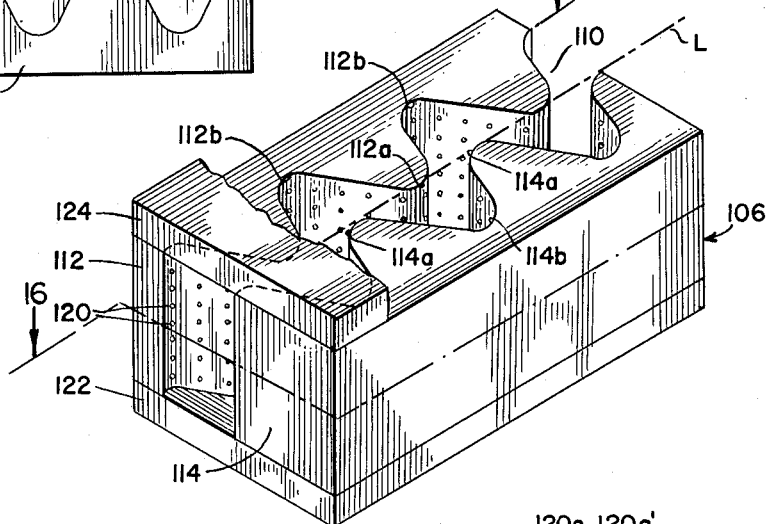
Figure 16:
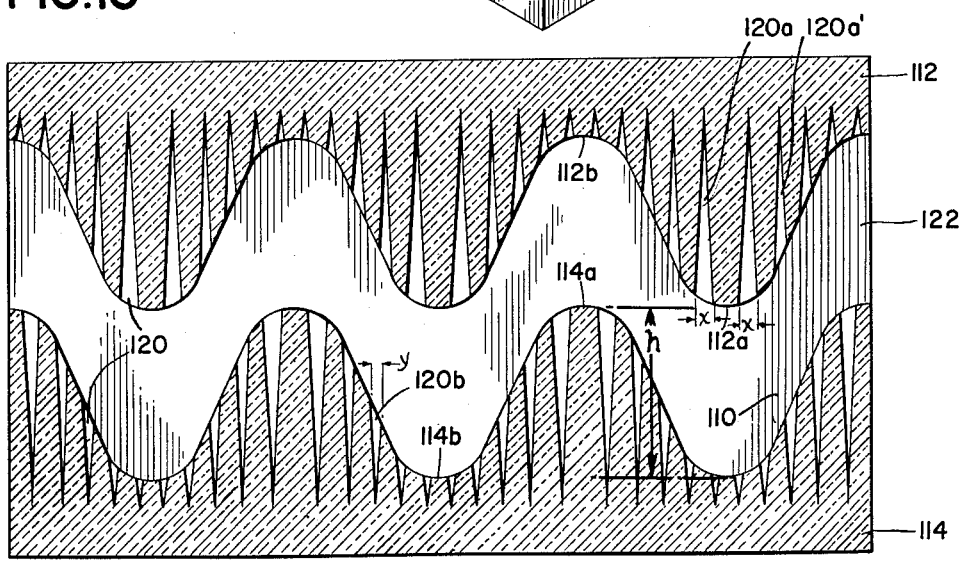

FIG. 10, to be used in illustrating the method of forming the absorber of FIG. 9, is a view of half this absorber, as viewed from the longitudinal sectional plane 10—10 shown in FIG. 9;

FIG. 11 is a longitudinal sectional view of the layer shown in FIG. 8, as it appears in the sectional plane 11—11 indicated in FIG. 8;

FIG. 12 is a plan view of apparatus for punching cavities into opposite faces of a slab of open-celled cellular material, for forming an absorber like that of FIGS. 1–3;

FIG. 12a is an enlarged plan view in general similar to a portion of FIG. 12 but showing an alternative embodiment;

FIG. 13 is a diagrammatic plan view of an air blower, an air duct and an acoustic filter inserted in the air duct;

FIG. 14 is a plan view of a block of open-celled cellular glass which has been cut into two bodies along a sinuous line, the two bodies, when assembled with other parts, forming the acoustic filter;

FIG. 15 is a perspective view of the acoustic filter, the top plate being broken away;

FIG. 16 is an enlarged horizontal longitudinal sectional view of the acoustic filter of FIG. 15 taken along the horizontal plane which includes the line 16—16 in FIG. 15, looking in the direction indicated;

FIG. 17 is a fragmentary view of a portion of an apparatus for forming cavities in the acoustic filter of FIG. 15;

FIGS. 18 and 19 are horizontal longitudinal views similar to FIG. 16 but illustrating alternative acoustic filters useful in connection with the invention; and FIGS. 20 and 21 are diagrammatic plan views of air ducts having a plurality of the acoustic filters of FIG. 15 inserted therein.

The various absorbers described herein are made from open-celled frangible cellular material, preferably cellular glass, the cells of which have been opened.

It is known to prepare cellular glass by various methods. For example, air or other gas may be injected into a mass of molten glass or clay to obtain a more or less uniform distribution of bubbles in the glass thereby producing a cellular structure in the glass upon cooling. Another method is to melt glass which contains absorbed gas and subject the molten glass to reduced pressure in order to release the absorbed gas in the form of bubbles in the glass. Still another method is to mix pulverized glass with a suitable gas-producing mixture of powdered materials and heat the mixture to a sintering temperature to obtain a mass containing bubbles. A method of the latter type is disclosed in Long Patent 2,123,536, granted July 12, 1938.

Open-celled cellular glass may be made by placing a slab of cellular glass having closed abutting cells, in a closed chamber, and applying to the interior of the chamber a gradually increasing gaseous pressure so as progressively to break passages from cell to cell throughout the material without otherwise breaking down the structure, as described more fully in my Patent No. 2,596,659 granted May 13, 1952.

In FIGS. 1–3 there is shown a space absorber comprising a slab 10 of open-celled cellular glass, having a series of elongated recesses therein. Preferably these recesses extend in from both the principal faces; thus cavities 12 extend in from one face, part way through the slab and cavities 14 extend in from the other face, part way through the slab. There are definite advantages in having these cavities extend inwardly far enough so that the cavities 12 overlap or interleave with the cavities 14, as shown in FIG. 3. It is preferable, however, that the cavities 12 not meet the cavities 14.

In the illustration, the cavities 12 and 14 are symmetrically arranged so that a typical cavity 14 extends between, and is equidistant from, three cavities 12, these cavities 12 being arranged in the corners of an equilateral triangle. Likewise, a typical cavity 12 extends between, and is equidistant from, three cavities 14, these cavities 14 being arranged in the corners of an equilateral triangle. Although this particular arrangement has definite advantages, other arrangements may be used.

Because the cells 13 (FIG. 3a) of the material are open and interconnected by passages, such as the passages 15, each of the cavities 12 is in communication with its neighboring cavities 12, and is also in communication with its neighboring cavities 14.

The volume of a typical cavity 12 or 14 is large compared to the volume of a typical cell in the material. In diameter, a cavity may, in some instances, be about the same size as the diameter of a typical cell. Each of these cavities is, however, in both its diameter and its length, of small dimension compared to the wavelengths of the acoustic energy which it is principally designed to absorb. In general, the absorption of the higher frequency components is not particularly difficult with porous material. It is the absorption of the lower frequency components which is more difficult, and it is to improve the absorption of these low frequency components that the cavities are principally designed. In this context, the low frequency components may be understood to be those having frequencies below 400 c.p.s., down to the lowest audible frequencies.

As an illustration, in one satisfactory absorber, these cavities are $\frac{1}{16}$ inch in diameter, 2 inches deep, and spaced apart $\frac{3}{8}$ inch from center to center. The slab itself, in this illustration, is 12 inches by 12 inches, and three inches thick. In an area 10.875 inches by 11.016 inches, there are thus 1020 holes.

The cavities extending into one side may, in some cases, be of different geometry from those extending into the other. Thus they may be of different depth, width, or shape.

Each of the cavities 12 is sufficiently close to its neighboring cavities 12, and to its neighboring cavities 14, to cause pressure fluctuations in a surrounding zone of this open-celled cellular material and these fluctuations in turn affect the action of the air in the neighboring cavities, as has been previously described. The result is to improve the amount of absorption, and also to broaden the band of frequencies for which the absorber is particularly effective. It will be noted that if the spacing between adjacent cavities one one side is the distance $d$, the spacing between the inner end of a given cavity and the inner end of a cavity extending from the opposite surface is a fraction of $d$.

In the preferred method and apparatus for forming the absorber shown in FIGS. 1–3, the cavities 12 and 14 are punched in from opposite surfaces of the slab simultaneously. In this way, the pressure applied to opposite surfaces of the slab is approximately equalized, and although the slab receives point loading on each of its opposite surfaces sufficient in small regions to fracture the glass, the equalized pressure applied to the spaced points of the two surfaces prevents any tendency to damage the slab as a whole. Apparatus for this purpose will be described at a later point in connection with FIG. 13.

The open-celled cellular glass used is strong and rigid, so far as the slab itself is concerned, its average compressive strength being of the order of 100 pounds per square inch. However it is, in local zones, readily frangible under point loading, being locally brittle. These properties are highly advantageous in the absorbers described herein, and in the method for forming them. They enable the formation of very accurately dimensioned absorbers, including recesses therein, in a highly economical manner.

In FIG. 4 there is shown a typical graph of absorption versus frequency representing the performance of an illustrative space absorber constructed in accordance with FIGS. 1–3, having the dimensions referred to above. The graph is seen to show material absorption over an audio-frequency band extending from 100 to 10,000 cycles per second. The performance curve 16 is influenced by the spacing of the units in the room and the geometry of the room. In a typical installation where 12" by 12" absorbers were spaced on four foot centers, the absorption was as shown in FIG. 4.

It has been pointed out above that absorbers constructed in accordance with FIGS. 1–3 are useful as space absorbers. Absorbers of the same general construction are also very effective when one of their principal faces is bonded to a wall. When constructed for this use, the dimensions described above have been found quite suitable, except that improvement has been found in one illustrative embodiment if the depth of the cavities facing the wall is less than the depth of the cavities facing the room. The cavities facing the wall may, for example, be 1½ inches deep while the ones facing the room may be 2 inches deep, in an absorber 3 inches thick. These dimensions are, of course, purely illustrative.

Figure 5:
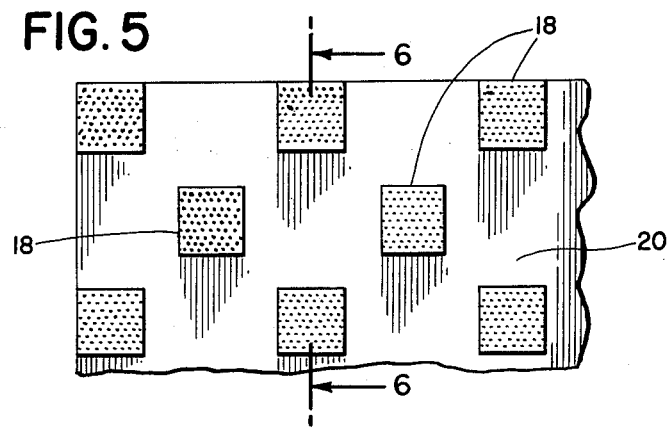
FIG. 5 is an elevational view of an array of wall absorbers, applied, in spaced-apart relation, to a wall.
Figure 6:
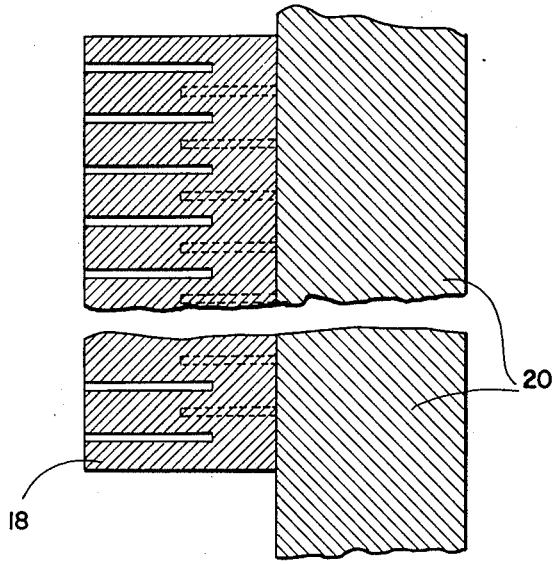
FIG. 6 is an enlarged cross-sectional view, at the position 6—6 in FIG. 5, showing the wall with one of the absorbers of FIG. 5 applied to it.

In FIGS. 5 and 6 there is shown an array of such absorbers 18 applied to a wall 20 of a room. These absorbers, having very high absorption, are particularly well adapted for use in a spaced-apart array, in accordance with the teachings of my co-pending application Serial No. 559,191, filed January 16, 1956. Considerable advantage has been found in employing arrays of spaced-apart absorbers, wherein the absorbers have very high absorption, and are of such dimensions that the width is in the range of from 6 to 24 inches and the length range is from 12 to 36 inches (these dimensions being of the order of a half-wavelength of some of the principal sound frequency components to be absorbed), and are spaced apart so that the total area of the wall itself, between the absorbers, is not less than one-half and not more than six times the total area of the exposed principal faces of the absorbers.

Figure 7:
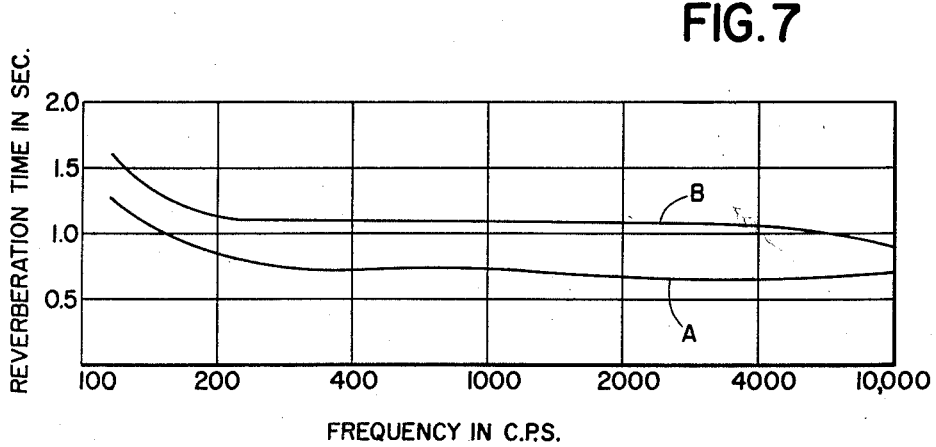
FIG. 7 shows two graphs; one of these graphs shows reverberation time versus frequency for a typical room including on one wall a spaced-apart array of wall absorbers as in FIG. 5. The other graph shows, for contrast, the different results obtained in the same room, for an arrangement in which the same amount of absorbing material is not spaced apart but is arranged in a single patch.

FIG. 7 graphically shows the advantage of employing a spaced-apart arrangement as described above, as contrasted to an arrangement in which all the absorbing material is in one patch.

In FIG. 7, curve A is a graph of reverberation time versus frequency for a room such as a typical private office including an area of absorbers as shown in FIG. 5. Curve B is a graph of reverberation time versus frequency in the same room, in which the same amount of absorbing material is not spaced apart, but is arranged in a single patch. The performance shown in curve B is not normally considered acceptable for an acoustically treated room. The performance shown in curve A is much better than that in curve B, and is acceptable.

The data shown was taken, using 100 square feet of 3 inch thick open-celled cellular glass, perforated from each side. For curve B, the material was arranged as a single 10 feet by 10 feet patch. The room's volume in which the measurements were made was 2600 cubic feet. The slabs used included recesses extending in from each side, $\frac{1}{16}$ inch in diameter on $\frac{3}{8}$ inch centers. The recesses on the exposed face were 2 inches deep. Those on the face next to the wall were 1½ inches deep.

The advantage of the proposed array arrangement is also shown by the following table of measurements:

| Frequency in c.p.s. | Absorption in sabins per square foot absorber ||
|---|---|---|
| | Absorbers in contact with one another | Absorbers spaced to cover 25% of area |
| 125 | 0.40 | 0.60 |
| 250 | 0.70 | 1.10 |
| 500 | 0.76 | 1.30 |
| 1,000 | 0.76 | 1.40 |
| 2,000 | 0.76 | 1.45 |
| 4,000 | 0.70 | 1.40 |
| 8,000 | 0.60 | 1.00 |

FIGS. 8, 9, 10 and 11 show still another embodiment of a wall absorber. The method of constructing such an absorber includes the steps of providing a slab 26 of open-celled cellular glass, formed by the method previously described, and sawing or otherwise cutting a series of parallel slots 28 and 30 into each of the principal faces of the slab. The slots 28 and 30 extend part way through the slab, and overlap or interleave in the manner shown. They are spaced apart so that fluctuations of air pressure within the slots 28, acting through the open-celled cellular material, affect or interact with fluctuations of air pressure within other slots 28, and also within neighboring slots 30, and vice versa.

A similar slab 31 is formed, including slots 32 and 34. Then the slabs 26 and 31 are bonded together by applying spaced-apart strips or bands of adhesive 36 running transversely of the slots 30 and 34, as shown in FIG. 10, and thereafter pressing the slabs together as shown in FIG. 9. In FIG. 10, the spaces between the adhesive strips 36 are identified by the reference character 37. The relative spacing of the slots appears in FIG. 9, and it may be seen that the slots 30 in the region of their inner extremities (near the sectional plane 10) lie symmetrically between the slots 34.

In applying the adhesive, care should be taken to prevent it from forming a continuous acoustically impervious layer between the slabs, because that would prevent coupling of acoustic energy from the cavities in one slab to those in the other. It should be understood, in FIG. 9, that, for clarity of illustration, the adhesive layer appears thicker than it would be in fact.

In sawing or cutting the slots into the component slabs from opposite surfaces, in a preferred method, the slots can be cut in from these opposite surfaces simultaneously. Alternatively a blade of the necessary dimension may be forced in, so as to apply loading in a local region, to create the cavities.

It may be noted in FIG. 9 that the cavities 30 and 34 are, in the completed absorber, internal cavities, not directly exposed to the exterior of the absorber.

In FIG. 11 the shape of the slots 28 and 30 in longitudinal section, may be seen. It may be noted in the drawing that the slots do not extend all the way to the edges of the slab, but terminate prior to the edges. Thus the slots are closed at each end. Near their ends, as may be seen in FIG. 11, the bottoms of the slots curve toward the surface of the slab. The shape shown for the slots 28 and 30 is preferred also for the slots 32 and 34.

In one method of sawing the slots, one or a plurality of parallel circular saws are used, and the slab is moved first in a direction perpendicular to the face of the slab toward the saws, so that the saws enter the slab near but not at one of its ends, thereby cutting the rounded end of each of the desired slots. Then the slab is moved longitudinally so as to cut the main portion of each of the parallel slots, the movement being checked before the slot reaches the end of the slab. Finally the slab is moved outwardly, radially away from the saws, in a direction perpendicular to the face of the slab.

In an illustrative embodiment made in accordance with FIGS. 8, 9 and 10, the slabs are 12 inches wide and 18 inches long (measured longitudinally of the slots). Each of the component slabs is 4 inches thick, and therefore the combined thickness, of a slab made up of two of the components, is 8 inches. The space $d$ between slots in a given face is 1½ inches. Individual slots are ⅛ inch wide and 2½ inches deep in their deepest region. The bands of adhesive are each about one-half inch wide and spaced one inch apart, from center to center. These dimensions are illustrative. It will be noted that in the region where the slots interleave, the spacing between interleaving slots is about one-half $d$.

In one embodiment, each of the four groups of slots 28, 30, 32, and 34 may be different in geometry (size, shape, etc.) from the others.

In the embodiment illustrated in FIG. 9, the slot-shaped cavities are all parallel. In other variations, the slots in one of the slabs may run at right angles to those in the other slab as in FIG. 9a, or at other angles.

In a variation of the multi-layer absorber of FIG. 9, the recesses, instead of being slots as shown in FIGS. 8 and 11, may be holes of the type shown in FIGS. 1–3. Thus, instead of bonding together two or more slotted absorbers of the types shown in FIG. 8, one may bond together two or more of the absorbers of the type shown and described in connection with FIGS. 1–3.

In a variation of the two-slab arrangement illustrated in FIGS. 8–11, the cavities, instead of being continuous slots as shown, may be discontinuous, or may take the form of a series of holes. That is, the two-slab absorber of FIG. 9 may comprise two slotted slabs of the type illustrated in FIGS. 8 and 11 or, instead, two punched slabs of the type illustrated in FIG. 3.

Apparatus for simultaneously punching cavities in opposite surfaces of a slab of frangible cellular material, so as to form an absorber of a type illustrated in FIGS. 1–3, is shown in FIG. 12. In this figure there is shown a frame 60 carrying guide sheets 62. It will be understood that the two portions of the frame 60, on either side of the work, are rigidly connected together, although this connection is not visible in the drawing. Supported on the frame are pneumatic or hydraulic cylinders 64 and 66. Each of these cylinders is provided with a piston, and is adapted to actuate a piston rod or plunger. The two cylinders are connected with the same pneumatic or hydraulic system, including valve and conduit means for simultaneously actuating the two pistons, with substantially equal force, to drive them toward one another, for performing the punching operation and for thereafter moving them apart, by applying fluid pressure against the pistons in the reverse direction to retract them after the punching operation. A slab 68 of open-celled cellular glass is shown in position to be punched, while a slab 70 already punched is shown as having been pushed out of the way by the slab 68, and other slabs 72 are shown in position to replace slab 68 successively in punching position. Associated with the plunger 63 of the cylinder 64 is a plate 74 to which are rigidly attached a plurality of pins 76 arranged in a desired pattern to which the recesses in the upper face of the acoustical slab are to conform. The plunger is shown in the retracted position, in which the pins do not quite touch the surface of the slab to be punched but extend into matching clearance holes in a stripping plate 78. This plate forms a part of one of the guide sheets and is attached to it, so as to be fixed in position. Associated with the plunger 65 of cylinder 66 is a similar group of elements comprising a plate 82, which carries pins 84, which in general will not be aligned with pins 76. Affixed to the guide sheet adjacent it is a stripping plate 86, including holes through which the pins 84 may project.

The pins 76 are not in alignment with the pins 84, but on the contrary are so relatively positioned that one set of pins fits between the other set. The length of the stroke of the apparatus is such that each set of pins is forced more than half way through the slab. The result is to produce a pattern of cavities extending into the slab like that shown in FIGS. 1–3, in which the cavities extending in from one side extend between, but do not intersect, the cavities extending into the slab from the other side.

Means such as a pneumatic or hydraulic cylinder 90 and associated plunger 91, for example, may be provided for advancing the slabs one at a time into punching position.

In the operation of the system of FIG. 12, a slab of open-celled frangible cellular material such as slab 68 is positioned between the stripping plates 78 and 86 and then both cylinders 64 and 66 are operated simultaneously to drive the pins 76 and 84 into the slab 68 at the same time. The slab is thus subjected to point loading from each side simultaneously at a very large number of points spaced across its principal faces. In a sense, the slab is floating on the two sets of pins, as they advance. The equalized pressure in substantially opposed regions prevents damage to the slab as a whole. To aid in assuring that this floating action takes place, it is preferable to provide a slight clearance between the stripper plates and the slab on both sides. When the pins have been driven the proper distances into the slab 68, the forward driving pressure in the cylinders 64 and 66 is simultaneously released and the plungers are then simultaneously retracted by reversing the pneumatic or hydraulic force. The stripping plates then hold the slab in place while the pins are withdrawn. Thereupon the plunger 91 is actuated to push the slab 68 out of the position between the pins, and to push a slab 72 into that position.

The depth of the cavities may be controlled, in one arrangement, by the length of the pins on each side. To cause the cavities to overlap (without intersecting) the length of the cavities entering from one side plus the length of those entering from the other should be greater than the thickness of the slab. Instead of applying pneumatic or hydraulic force, or the equivalent, to both plungers 63 and 65, it may be applied to only one, say 63, and the other plunger 65 and its pins may be held fixed in the position shown.

Reference is made to FIG. 12a, which schematically illustrates a different way of mounting the stripper plates, for this variation. The stripper plate 78a is spring mounted with respect to its guide sheet 62a and the stripper plate 86a is spring mounted with respect to its guide sheet 62b, with the aid of springs 80a and 80b respectively. These springs 80a and 80b, are very schematically shown in FIG. 12a but will be understood to be constructed and arranged so as to bias the stripper plates toward an equilibrium position, in alignment with their associated guide sheets. In the early portion of the forward stroke of the plunger 63, the advancing pins 76 apply force to one side of the slab 68a. This slab is thus pressed against the stripper plate 86a, and the springs 80b yield and allow the plate 86a along with the slab to move toward the pins 84. Thus the pins 76 have the effect of pressing the slab against the stationary pins 84, and the pins thereby apply point loading to the slab so as to form cavities in both of its principal faces. During the latter portion of the stroke, the plate 74 engages the stripper plate 78a, and displaces it, against its associated spring means 80a, in the forward direction. At the end of the forward stroke, the slab is, in effect, gripped between the stripper plates 78a and 86a, which in turn are gripped between the plates 74 and 82. The depth of the cavities may be controlled by the length of the pins on each side.

The stripper plates may be made slightly larger than the slab, to aid in making certain that the slab does not strike the guide sheets and thereby interfere with its sidewise displacement on the forward stroke. Also, the slabs may be advanced into position in a spaced-apart relationship, in this embodiment, on an indexing conveyor. The spaced-apart relationship is an aid in making certain that the slabs are free to be shifted sidewise on the forward stroke. When the motion of the plunger 63 is reversed, the spring force tends to restore the stripper plates 78a and 86a to their original, equilibrium positions, along with the slab. The slab thus moves away from the pins 84, and the pins 76 move away from the slab. The spring means 80b for the plate 86a should be weak enough that the force of the slab against this plate is less than the force required to push the pins into the slab. Also, to prevent damage to the slab, it is preferable that the stripper plates, particularly the plate 86a, when used in this spring type embodiment, be somewhat flexible. This prevents the plate from applying an abnormally high force to any local region of the face of the slab, as contrasted to other regions, as the slab is forced against the plate, thus preventing undesired damage to the slab.

In certain of its embodiments, the present invention may also be applied to acoustic filters or sound absorbers for air ducts. It is particularly useful, for this purpose, as a sound absorbing duct lining which may include special geometry to minimize hydrodynamic pressure drop while maintaining good sound attenuation.

Ducts which convey air also transmit sound, and this sound transmission is often undesirable. By the method described herein, it is possible to make acoustic filters which, when inserted in an air duct, allow free flow of air through the duct but give a noise reduction of 20 to 60 db in a total length of 2 to 10 feet with a reasonable portion of this reduction in the low frequency range (50 c.p.s. to 400 c.p.s.). This is advantageous, both from the standpoint of economy, and saving in space, as contrasted with other arrangements, which would need to be very long in order to give adequate sound reduction. In many situations, space is not available for a long duct run. An example is the problem of preventing sound transmission through ventilating ducts between two adjacent offices.

In FIG. 13 there is shown an air blower 102 connected to an air duct 104. An acoustic filter 106 is interposed in the air duct and is connected to its by flexible couplings 108. In flowing through the filter 106, air flows through a sinous passage 110 formed in part by two bodies 112 and 114 of open-celled cellular glass.

Various advantages of open-celled cellular glass, as sound absorbers, have been previously pointed out herein. In addition, it may be noted here that most rigid materials are set into vibration by sound and transmit these vibrations rather freely. This phenomenon is referred to in acoustic parlance as "telegraphing" of sound. It is not possible to make an effective short length acoustic filter, without elaborate vibration breaks, of any rigid material which "telegraphs" the sound. Though the reasons are not completely understood, open-celled cellular glass does not "telegraph" sound to any appreciable extent. Hence, the embodiments here described are economical and effective when open-celled cellular glass is used because the filter is only required to attenuate the airborne noise.

Referring to FIG. 14, the two bodies 112 and 114 of open-celled cellular glass are formed by cutting a block 116 of the material along the sinuous line 118. Referring now more particularly to FIGS. 15 and 16, each of the blocks 112 and 114 of open-celled cellular glass is provided with recesses 120 which open into the passage 110. The body 112 comprises peaks 112a and valleys 112b and the body 114 comprises peaks 114a and valleys 114b. A body 112 and a body 114 are placed on and cemented to a bottom plate 122, the bodies 112 and 114 being in spaced apart relationship so as to provide the passage 110 between them. Hot asphalt, neoprene cement or any other suitable cement may be used for joining the bodies 112 and 114 to the plate 122. A top plate 124 is then bonded to the bodies 112 and 114. The plates 122 and 124 secure the sound absorbing bodies 112 and 114 in spaced apart relation to form the passage 110. In the embodiment shown, the plates 122 and 124 are made of closed-cell cellular glass but they may be made of any other suitable material since it is not essential that they have sound absorbing properties. They may, however, if desired, be made of open-celled cellular glass or other porous material. However, in this embodiment, at least the major part of the walls of the sinuous passage 110 are made of open-celled cellular glass. If the plates 122 and 124 are made of open-celled or other porous material, it is desirable to seal their outer surfaces to aid in preventing sound transmission through them.

After the steps of cutting the block 116 along the sinuous line 118, as shown in FIG. 14, and separating it into the two bodies 112 and 114, but before joining these bodies to the bottom plate 122, recesses 120 are formed in these bodies, by forcing into these bodies relatively long, thin, rigid members, such as the rods 130 shown in FIG. 17, for example, so as to form these desired recesses, and then removing these rods. The dimensions of individual rods (which need not be the same from rod to rod) are chosen so as to produce recesses having the desired acoustic properties. The depth of the cavities is primarily controlled by the length of the rods or the distance of insertion of same, and is not controlled by the sinuousity of the passage.

Referring now more particularly to FIG. 16 the recesses 120 act as damped resonant cavities for absorbing sound. The frequency to which a recess is tuned, i.e., the frequency at which sound absorption is most efficient, is dependent upon various factors among which are the depth of the recess, the diameter of the mouth of the recess, the spacing between the recesses, the acoustic characteristics of the material in which the recesses are formed and the shape of the recesses.

In my acoustic filters, some of the recesses 120 in the face between two successive valleys are tuned to different frequencies than other of the recesses in said face. Generally speaking, the recesses 120a and 120a' which are formed in the thick portions of the bodies 112 and 114, that is, the portions adjacent the peaks 112a and 114a, are deeper and have a larger mouth diameter than the remaining recesses, such as the recess 120b. Thus, in the embodiment shown in FIG. 16, the recesses 120a and 120a' each have a comparatively large mouth diameter, measured along the lines $x$ in directions normal to the longitudinal axes of the recesses, these recesses being spaced on ¾ inch centers. All of the remaining recesses have somewhat smaller mouth diameters and are spaced from each other on ½ inch centers. The mouth diameters for these remaining recesses are measured along lines located in a manner similar to the line $y$ in FIG. 16, denoting the mouth diameter of the recesses 120b. The large diameter deep recesses 120a and 120a' are best for low frequency sound absorption and the smaller diameter shallower recesses, such as the recess 120b, are best for intermediate frequencies. In the embodiment shown in FIG. 16, all of the recesses are tapered but, if desired, they may be made straight, as illustrated by the straight recesses 220 in FIG. 18, or some of them tapered and some of them straight, as shown by the alternately arranged tapered recesses 222 and straight recesses 224 in FIG. 19. The height of the peaks 112a and 114a above the valleys 112b and 114b, this height being designated by reference letter $h$ in FIG. 16, is at least 3 inches. In the preferred embodiment, the peaks 114a of the body 114 and the peaks 112a of the body 112 lie approximately in a single longitudinal line L extending through the filter as shown in FIGS. 13 and 15. In any event, it is desirable that the transverse distance between the line connecting the peaks of the body 112 and the line connecting the peaks of the body 114 be not more than one-fifth of the height $h$ of the peaks above the valleys.

In the embodiment shown in FIGURES 13-16, for example, a single acoustic filter 106 is interposed in the air duct 104. However, if it is desired to increase the air handling capacity beyond that which can be obtained by a single filter, one can use a plurality of acoustic filters arranged in parallel, such as the filters 106a and 106b in FIG. 20, to provide a plurality of passages 110a and 110b arranged in parallel connected to the air duct 104a. The filters can also be used in series, as shown by the filters 110c and 110d in FIG. 21, to obtain higher attenuation.

It will be understood that the invention is not limited, in its broadest aspect, to use with absorbers having the specific shapes illustrated herein.

Referring again to space absorbers and wall absorbers, as well as duct-type absorbers, it may be pointed out that best results are usually obtained by dimensioning the cavities so that the aggregate area of the mouths of the cavities formed in the surface of an absorber is a small portion of said surface, less than twenty percent, and typically of the order of five percent.

Best results are obtained when the cavities are of blind or cul-de-sac construction. It has previously been pointed out, however, that there is an effective interaction, through the surrounding material, of the pressure fluctuations in neighboring cavities.

In absorbers of the general types illustrated in FIGS. 3, 6 and 9, where cavities enter a slab from its opposite sides, typical good values for the depth of the cavities are at least one-half and preferably of the order of two-thirds or three-fourths of the thickness of the slab. Where one face of the absorber is against a wall, for example as in FIG. 6, the individual cavities entering from the wall side should preferably have approximately the same cross-sectional area as those entering from the front. The ones entering from the wall side should preferably not be quite as deep as the ones entering from the exposed side.

Considering now the exposed cavities in the various embodiments, it may be pointed out that the flow resistance of the cavities should be large compared to the impedance of air, but should be appreciably smaller than the flow resistance of the porous material that forms the walls of the cavities.

The effective impedance of a cavity should be greater than, and preferably at least twice as great as, the product of the density of air and the velocity of sound. (A typical value for this product is 42 rayls.)

It will be understood that one characteristic of the open-celled cellular glass described herein is that the opened cells are, to a great extent, in communication with one another, giving the material a porous property.

Although open-celled cellular glass is referred to herein as a preferred material, and it has a number of unique advantages, the invention is not, in its broadest aspect, limited to the use of this material.

In some cases, there may be employed other locally-brittle materials having intercommunicating pores and having sufficient dimensional stability so that cavities formed therein retain accurately their shape, over long periods of time and under the physical conditions to which the absorber is exposed. The material employed, although porous, should have high flow resistance from one of its interstices to the next.

Also, there may be employed a material which, although not readily frangible at room temperature, is readily frangible at temperatures considerably below room temperature. In the use of such material, there is first formed a block of cellular material. It is then cooled to a temperature at which it is readily frangible, pressurized to fracture its cells and produce intercommunicating cells, and then, while maintained at or near such a temperature, is subjected to point loading, as by the pins 76 and 84 shown in FIGURES 12 and 12a, to form cavities in its surface in a manner similar to the formation of the various cavities shown in the drawings and described heretofore. Thereafter it is allowed to return to room temperature.

While suitable illustrative embodiments of absorbers, and methods and apparatus for making them, have been described, along with certain modifications, it will be understood that various changes may be made without departing from the general principles and scope of the invention.

I claim:

1. An absorber for acoustic energy, comprising a pair of slabs of open-celled cellular glass, each of said slabs having a plurality of elongated cavities extending into the same from opposite principal faces thereof more than half way through the slab so that they overlap but do not intersect, said pair of slabs being adhesively bonded together along spaced areas of adjacent principal faces, with the cavities in the inner face of one of said slabs positioned between those in the inner face of the other.

2. An absorber for acoustic energy, comprising a pair of slotted slabs of open-celled frangible cellular material, each of said slabs having a plurality of parallel slots extending into each of its opposite principal faces more than half way through the slab, positioned so that the slots entering from one of said faces are interleaved with the slots entering from the opposite face, the slots in each slab being spaced closely enough together so that coupling of acoustic energy is effected through the open cells of the open-celled cellular material between the slots entering the slab from one of said faces and those entering the slab from the opposite face, said slabs being bonded together along spaced areas of adjacent principal faces with all said slots running parallel to one another.

3. An adsorber for acoustic energy comprising a pair of slabs of open-celled, frangible cellular glass, each of said slabs having a plurality of recesses entering same from opposite sides, to change its acoustic impedance, said recesses entering each said slab from one of said sides approaching those entering it from the opposite side closely enough to enable air pressure fluctuations to be coupled between them through the open cells of the intervening open-celled cellular glass, said pair of slabs being adhesively bonded together along spaced areas of adjacent sides, with the recesses in the inner side of one of said slabs positioned between those in the inner side of the other.

4. An absorber of the character set forth in claim 1, in which said cavities are adapted to change the acoustic impedance of said slabs, the cavities extending into each slab from one principal face thereof being in sufficient proximity with the cavities extending into the opposite principal face to provide coupling of acoustic energy therebetween through the open cells of said glass.

5. An absorber for acoustic energy, comprising a pair of slabs of cellular material, each of said slabs having a plurality of elongated cavities extending into the same from opposite principal faces thereof, to change its acoustic impedance, the cavities from each principal face extending sufficiently far into the corresponding slab so that they are in close but non-intersecting proximity with the cavities from the opposite principal face, said pair of slabs being adhesively bonded together along spaced areas of adjacent principal faces.

6. An absorber for acoustic energy, comprising a pair of slabs of open-celled cellular material, each of said slabs having a plurality of elongated cavities extending into the same from at least one of the principal faces thereof, to change its acoustic impedance, said pair of slabs being adhesively bonded together along spaced areas of the principal faces including said cavities.

References Cited in the file of this patent

UNITED STATES PATENTS

| | | |
|---|---|---|
| 1,682,986 | Rymarczik | Sept. 4, 1928 |
| 1,910,810 | Nash | May 23, 1933 |
| 1,964,473 | Lesher | June 26, 1934 |
| 2,008,278 | Goss | July 16, 1935 |
| 2,031,950 | Harshberger | Feb. 25, 1936 |
| 2,060,241 | Prudden | Nov. 10, 1936 |
| 2,114,546 | Slayter | Apr. 19, 1938 |
| 2,127,867 | Harvey | Aug. 23, 1938 |
| 2,142,463 | Upson | Jan. 3, 1939 |
| 2,186,594 | Rosenberg | Jan. 9, 1940 |
| 2,196,615 | Surprenant | Apr. 9, 1940 |
| 2,278,288 | Sadler | Mar. 31, 1942 |
| 2,355,454 | Lucius | Aug. 8, 1944 |
| 2,412,713 | Burt | Dec. 17, 1946 |
| 2,459,121 | Willey et al. | Jan. 11, 1949 |
| 2,502,016 | Olson | Mar. 28, 1950 |
| 2,596,659 | D'Eustachio | May 13, 1952 |
| 2,667,925 | Dalphone | Feb. 2, 1954 |
| 2,668,123 | Copeland | Feb. 2, 1954 |
| 2,671,522 | Bourgeois | Mar. 9, 1954 |
| 2,703,627 | D'Eustachio | Mar. 8, 1955 |
| 2,791,289 | Proudfoot et al. | May 7, 1957 |
| 2,853,147 | D'Eustachio | Sept. 23, 1958 |
| 2,933,147 | Stewart et al. | Apr. 19, 1960 |

FOREIGN PATENTS

| | | |
|---|---|---|
| 403,249 | Great Britain | Dec. 21, 1933 |
| 133,356 | Sweden | Oct. 23, 1951 |